US012524308B2

(12) United States Patent
Jana et al.

(10) Patent No.: US 12,524,308 B2
(45) Date of Patent: Jan. 13, 2026

(54) PRE-READ ASSISTED WRITE COALESCING FOR PARITY VIRTUAL DISKS

(71) Applicant: Avago Technologies International Sales Pte. Limited, Singapore (SG)

(72) Inventors: Arun Prakash Jana, Bengaluru (IN); Amar Deep Kumar, Bengaluru (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 93 days.

(21) Appl. No.: 18/649,961

(22) Filed: Apr. 29, 2024

(65) Prior Publication Data

US 2025/0335296 A1 Oct. 30, 2025

(51) Int. Cl.

| | |
|---|---|
| ***G06F 11/10*** | (2006.01) |
| ***G06F 12/08*** | (2016.01) |
| ***G06F 12/0871*** | (2016.01) |
| ***G06F 12/0891*** | (2016.01) |

(52) U.S. Cl.

CPC ...... *G06F 11/1076* (2013.01); *G06F 12/0871* (2013.01); *G06F 12/0891* (2013.01)

(58) Field of Classification Search

CPC ............ G06F 11/1076; G06F 12/0871; G06F 12/0891

See application file for complete search history.

(56) References Cited

U.S. PATENT DOCUMENTS

| | | | | |
|---|---|---|---|---|
| 11,513,891 B2 * | 11/2022 | Klein | .................. | G06F 9/30029 |
| 2016/0019114 A1 * | 1/2016 | Han | .................... | G06F 11/1076 714/764 |
| 2017/0046359 A1 * | 2/2017 | Sahasrabudhe | ......... | G06F 11/14 |

* cited by examiner

*Primary Examiner* — Masud K Khan

(74) *Attorney, Agent, or Firm* — King Intellectual Asset Management

(57) ABSTRACT

Solutions for providing increased performance of write operations that are candidates for coalesced writes but don't end up writing an entire row of new data. In accordance with some embodiments, a controller can perform a pre-read operation early, in some cases as soon as the write request received from the host is identified as a candidate for write coalescing.

20 Claims, 9 Drawing Sheets

PRE-READ ASSISTED WRITE COALESCING FOR PARITY VIRTUAL DISKS

TECHNICAL FIELD

This disclosure relates generally to RAID storage systems and more particularly to solutions for managing virtual disks in a RAID environment.

BACKGROUND

A redundant array of independent disks (RAID) storage system can logically consolidate multiple physical disks into one or more consolidated pools of storage resources. In many cases, a RAID controller will handle the management of these resources and will allocate the resources into one or more virtual disks (VD) (also referred to herein as "logical devices" or LD), each of which appears to the host (e.g., a computer operating system in communication with the controller) to be a single physical disk.

RAID systems generally are categorized according to a "level," which corresponds to the way in which data is written to the physical disks of the array. For example, RAID level 0 simply stripes data across all of the disks in the array, with no redundancy or fault tolerance, while RAID level 1 mirrors data across disks, with full redundancy. Some RAID levels employ parity, which can provide fault tolerance (e.g., the loss of a certain number of physical disks in the array without data loss) while using the capacity of the physical disks more efficiently than a mirroring scheme. For example, RAID levels 5 and 6, as well as various nested RAID levels (e.g., RAID level 5+0, or RAID level 50) employ distributed parity, wherein parity strips are written across various physical disks.

A parity strip generally is calculated for a row of data, which as explained below, often comprises a strip of data from each of the physical drives (other than the drive on which the parity data for that row is stored). Consequently, when any new data is written to the row, the parity strip should be recalculated, based on the existing data in the row together with the new data that has been written to the row. A typical process for performing this calculation includes caching the new data to be written to the drives, read the existing data and/or parity on the drive(s), calculating the new parity, and then writing the new data and parity to the drives. This process can impose a performance penalty on write operations, because it first requires the entire row to be read before any data can be written to the row.

To improve performance of sequential writes, some RAID systems implement write coalescing for parity VDs. Write coalescing for sequential streams can wait for a row to get fully populated and perform a write of the full row. This can mitigate the performance penalty of reading the existing data to calculate parity because the existing data on the drive for the row does not need to be read since it will be completely overwritten. Additionally, the controller does not need to read the parity, because the new parity can be calculated from the new data alone. Moreover, this can reduce the number of writes required, because the controller can write an entire row in one operation, rather than write more granular parts in multiple operations.

There is a limit, however, to how long the controller can wait for an entire row of data before affecting other operations, so the write coalescing operations will time out after a certain period. If there is not enough data to fill an entire row before the operation times out, the controller will need to execute the entire parity write operation, including a read of the full row. Since the write already has been delayed waiting for data to write an entire row, the performance of the write drops even further.

Thus, there is a need for a solution that can receive the benefit of coalesced writes without having to suffer the additional performance degradation that occurs when the write operation times out before an entire row of data is available to be written.

DETAILED DESCRIPTION

Some embodiments provide hardware-accelerated configurable devices, including without limitation RAID controllers, to increase the performance of write operations that are candidates for coalesced writes but don't end up writing an entire row of new data. In accordance with some embodiments, a controller can perform a pre-read operation early, e.g., in some cases, as soon as the write request received from the host (i.e., the computer, process, etc. that issues input-output requests to the device) is identified as a candidate for write coalescing.

As described in further detail below, the hardware of the device can determine which row is to be pre-read. In some embodiments, therefore, the hardware can pre-read all of the data from the row, so that this data is already available to calculate parity for the row in the case that the data received from the host does not overwrite the entire row. In such a case, the controller can use the portions of pre-read data from the virtual disk that will not be overwritten, together with the new data from the host, to calculate parity immediately upon determining that the new data will not overwrite the entire row. This avoids the performance penalty of having to read the existing data from that row of the VD to calculate the parity after determining that the entire row will not be over written.

Some embodiments can employ a pre-read operation to ensure the existing data on the row is available early to complete write operations to the row faster in case of a coalescing write failure. In accordance with some embodiments, the existing data from the row can be executed independently and/or initiated much early in the flow. Merely by way of example, in some embodiments the pre-read operation is initiated before the transfer of data from the host is initiated. Further, in some embodiments, the pre-read processing can execute in parallel with the transfer of the host data (e.g., via direct memory access by the controller) and also while the write operation is on hold as a write coalescing candidate. In such embodiments, the existing data pre-read from the VD often will be available much sooner than techniques that employ a sequential flow. These and other features of various embodiments can reduce completion time of the write operation significantly. Moreover, in some embodiments, if the cached row is fully dirty, it can be flushed without waiting for the pre-read operation to complete; consequently, in these embodiments, performance of successful write coalescing operations need not be negatively impacted. In some embodiments, since the complete row is pre-read, existing parity data need not be read; instead parity can be generated from the new data and the pre-read data.

Virtual Disk Technology

Figure 1A:
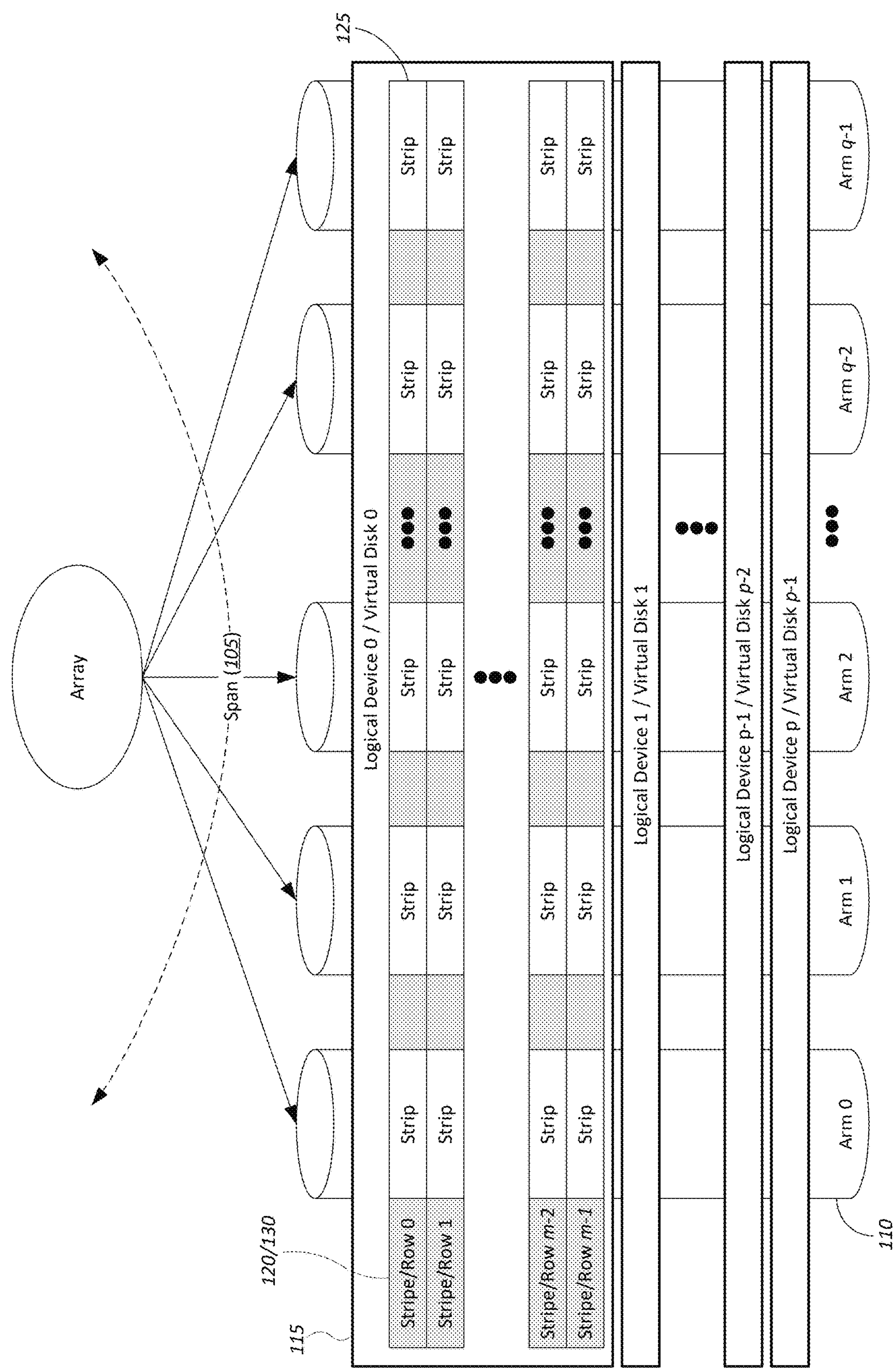
FIGS. 1A and 1B illustrate exemplary RAID arrays and virtual disk, in accordance with some embodiments.
Figure 1B:
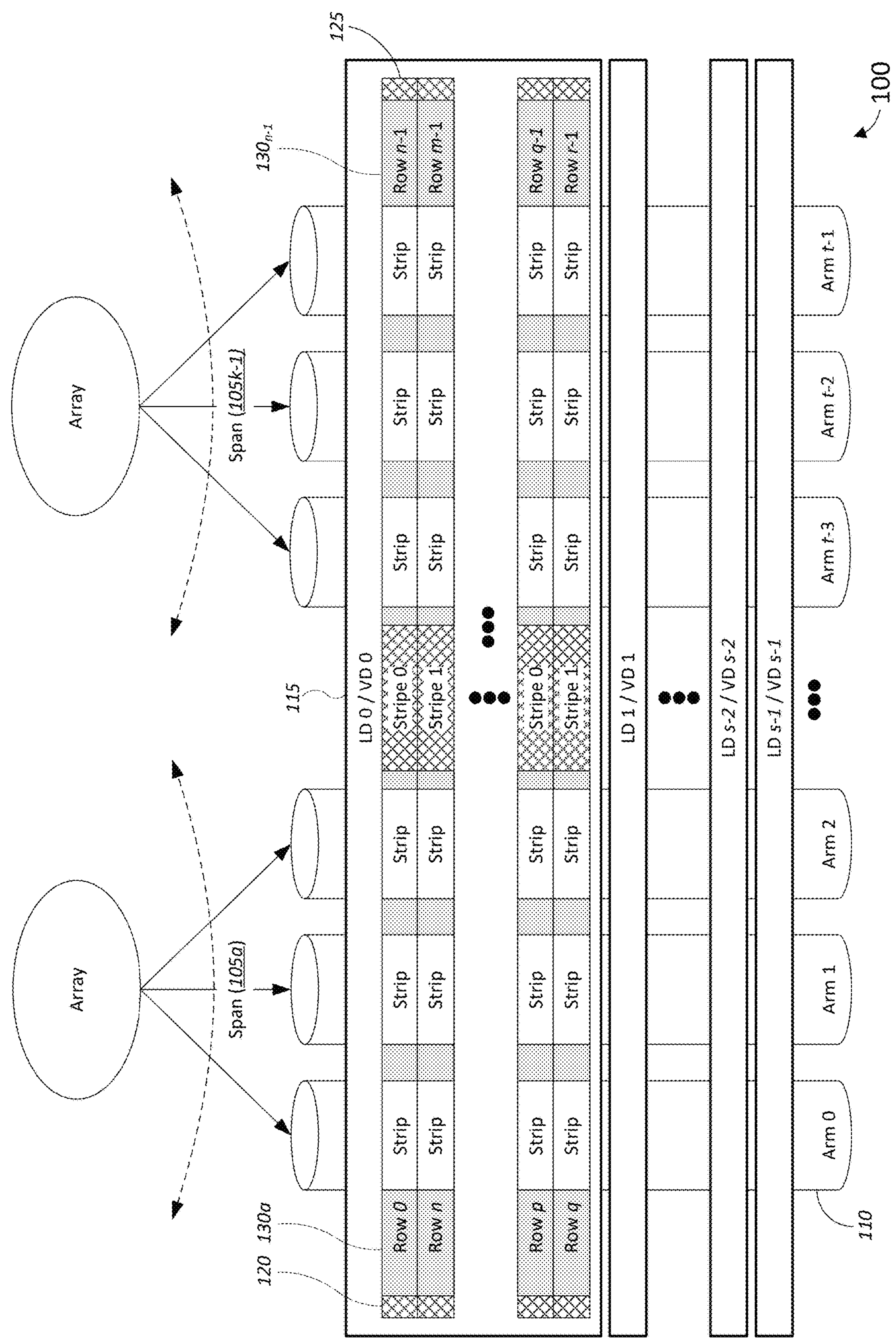

In some cases, a VD is part of a RAID array. FIG. 1A illustrates a single span RAID array 100, while FIG. 1B illustrates a multiple-span RAID array 100'. The array 100 of FIG. 1A utilizes a single span 105 of physical disks 110, each of which is also referred to herein as an "arm" of the VD. As illustrated on FIG. 1A, the array 100 is divided into a plurality of VDs 115. As illustrated by VD 115*a*, a VD 115 can include a plurality of stripes 120. Each stripe 120 includes a strip 125 from each arm 110 of the VD 115. A "strip" therefore describes a unit of storage on a single physical disk (arm). In an aspect, each strip 125 is the same size. As used herein the term "logical block" (LBA) means the smallest amount of data that can be written or read in a single drive IO, and each LBA has a fixed size (e.g., 4 KiB). Each strip 125 generally is a fixed number of LBA, such that a strip 125 might be a multiple of the LBA size (e.g., 64 KiB, 128 KiB, 256 KiB, etc.).

The multi-span array 100' of FIG. 1B is similar, except it includes multiple spans 105, each of which includes its own set of arms 110. In this case, a row 130 comprises the strips 125 from a single span 105, and the stripe 120 comprises the corresponding row 130 from each span 105. In some embodiments, all of the spans 105 are homogenous (e.g., each span 105 contains the same number of arms 110, the size of strips 125 in each span 105 is the same, etc.). In another aspect, a VD 115 starts on a stripe boundary. Thus, when comparing the arrays 100 and 100', each stripe 115 in the single-span array 100 is the same as a row 130 in the multi-span array 100'.

Figure 2:
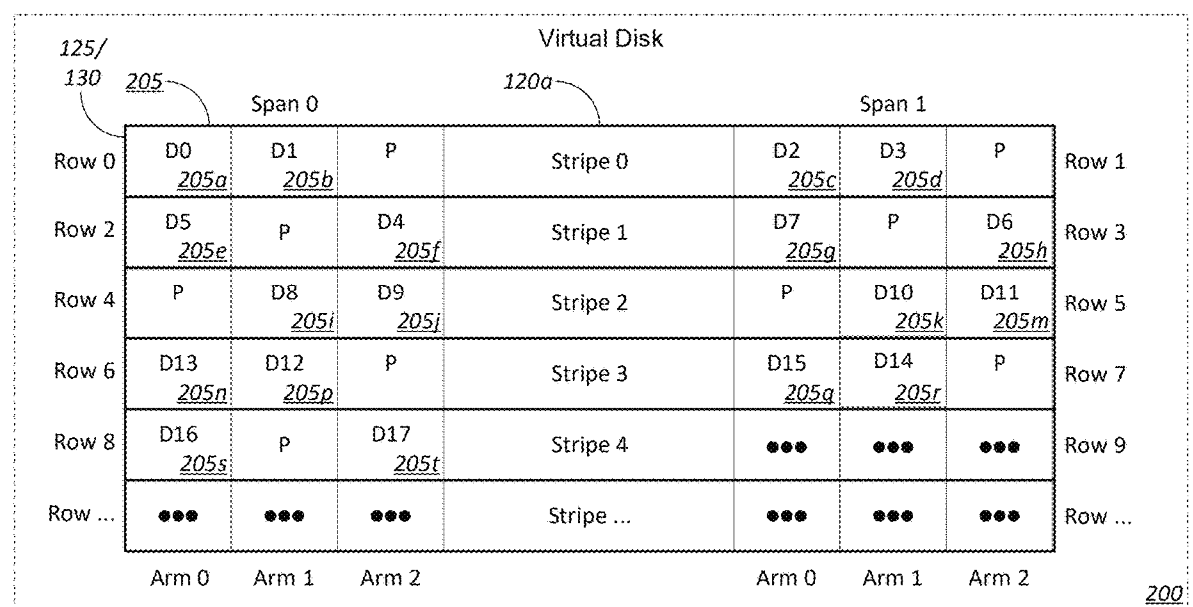
FIG. 2 illustrates an exemplary layout of a virtual disk employing parity, in accordance with some embodiments.

The arrays 100 and 100', for ease of description, do not include parity data. FIG. 2 illustrates an exemplary layout of a VD 200 that comprises three full stripes 120 (Stripes 0-2) and a half stripe (Row 8) of labeled LBAs 205. Each stripe 120 comprises two rows 130; for example, Stripe 0 comprises Row 0 and Row 1. For the sake of simplicity, each row 130 comprises one strip 125, and each strip 125 comprises three LBAs 205. For example, the first row, 130*a* (Row 0) consists of a single strip 125*a*, and that strip 125*a* comprises two data LBAs 205 (D0 and D1), and a parity block (P). (The parity block does not store any unique data but instead stores data from which corrupted LBA can be reconstructed.). In the case of a single-spanned virtual disk (such as that depicted in FIG. 1A), the stripe size is equivalent to the row size, because there is only one span. Hence, the stripe size of the exemplary VD 200 of FIG. 2 is 4 LBA.

It should be noted that the number and of entities (e.g., arms, stripes, rows, etc.) displayed in FIGS. 1A, 1B, and 2 is simplified for ease of description, and that a VD within the scope of the various embodiments can include any number or size of such entities, up to the capacity supported by implementation-specific hardware (e.g., controller hardware, physical drive hardware, etc.), firmware, and/or software.

EXEMPLARY EMBODIMENTS

Certain exemplary embodiments are described below. Each of the described embodiments can be implemented separately or in any combination, as would be appreciated by one skilled in the art. Thus, no single embodiment or combination of embodiments should be considered limiting.

Figure 3:
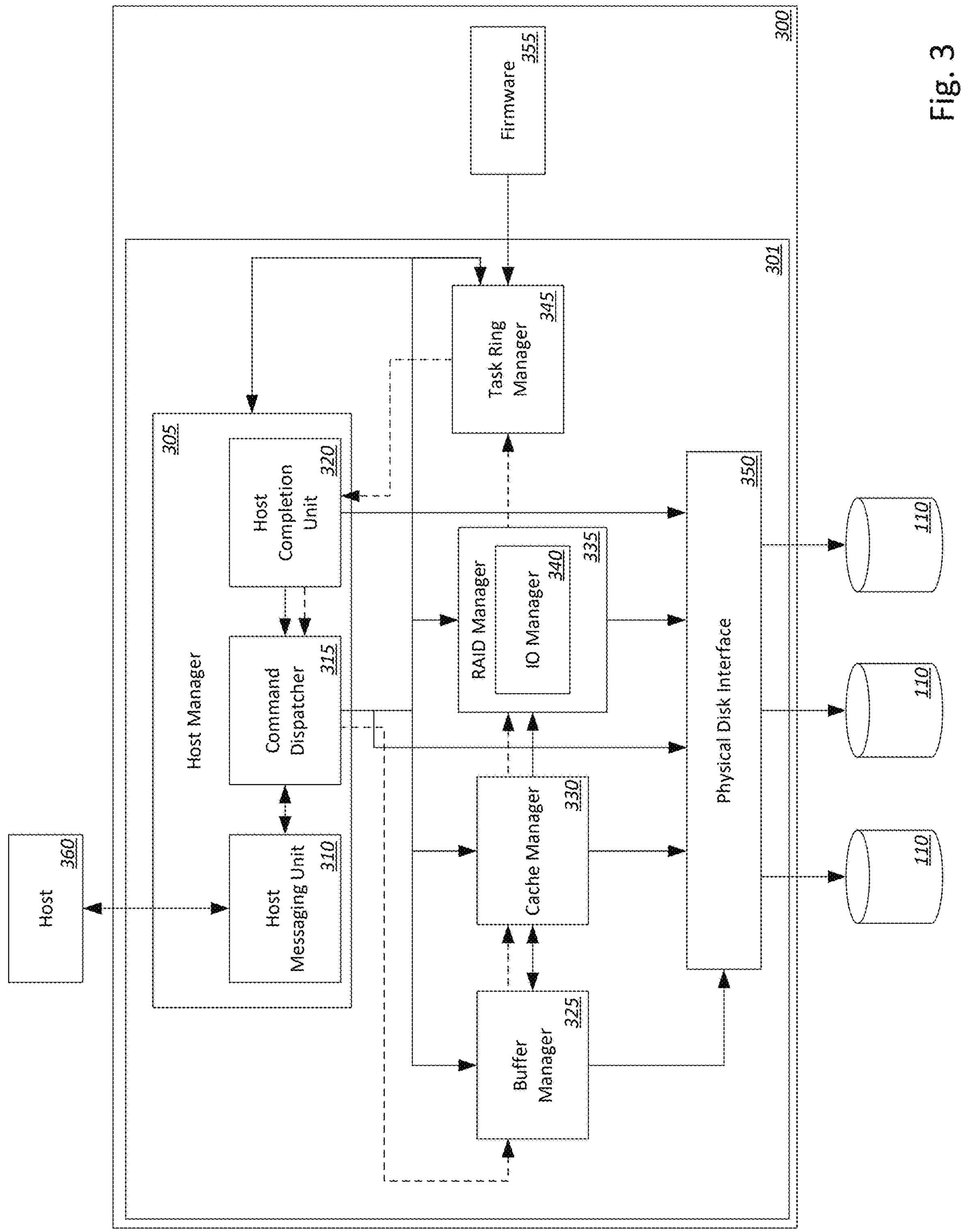
FIG. 3 is a block diagram illustrating a RAID controller, in accordance with some embodiments.

FIG. 3 illustrates an exemplary architecture for a device 300 (e.g., a RAID controller) that can be used in various embodiments. (It should be noted that, while this disclosure describes certain embodiments in the context of a RAID controller or other storage controller for purposes of illustration, embodiments are not limited to those types of devices but instead can include any device capable of performing the functionality discussed herein). In an aspect, the device comprises a set of hardware circuitry 301 (also referred to herein as simply "hardware"). This hardware circuitry 301 comprises several hardware components, each of which is encoded with circuitry to cause that component and/or the device 300 generally to perform, inter alia, the functions and procedures disclosed herein. The hardware circuitry 301 can comprise, without limitation, a host manager 305. The host manager 305 includes a host messaging unit (HMU) 310, a command dispatcher unit (CDU) 315, and a host completion unit (HCU) 320. The hardware circuitry 301 further comprises, in some embodiments, a buffer manager 325 and/or a cache manager 330. The hardware circuitry 301 can further comprise a RAID manager 335, which can include an IO manager 340, as well as a task ring manager 345, and/or a physical disk interface 355.

It should be noted that the device 300 illustrated in FIG. 3 is merely exemplary in nature, and many embodiments can comprise more, fewer, or different hardware components. In certain embodiments, each component of the hardware circuitry 301 performs discrete functions or tasks. In other embodiments, the hardware circuitry 301 can be considered to collectively perform such tasks, and/or the same or different components might perform other discrete tasks. Hence, embodiments are not limited to the structure disclosed in FIG. 3 unless explicitly stated; moreover, to the extent that an embodiment states that "hardware circuitry" itself performs a particular task, such an embodiment does not require any particular hardware component to perform that task.

In some embodiments, the device further comprises firmware 355, which, unlike the hardware circuitry 301, often includes instructions that can be executed by a processor, such as a microprocessor. The firmware 355 might generally comprise instructions stored on a persistent form of data storage, such as a programmable read only memory (PROM) or one of several derivatives, nonvolatile RAM, programmable logic devices (PLD), field programmable gate arrays (FPGA) and/or the like. The firmware 355 can be more adaptable and/or updateable (in some cases) than the hardware circuitry 301 and/or can perform more complex tasks. Often, however, the cost of this complexity and/or flexibility is speed. Each component of hardware circuitry 301 generally is optimized to perform one (or a few) relatively simple tasks, but to do so very quickly. In contrast, as described herein, some embodiments execute firmware instructions to perform more complex tasks, like storing diverted host IOs, calculating and allocating buffer segments, and performing maintenance tasks. In each of these cases, the tasks of the firmware 355 can include providing instructions to the hardware circuitry 301. (As described further below, the term "logic" is used broadly herein to refer, without limitation, to instructions stored and/or performed by hardware circuitry, firmware, software, and/or a processor.)

In the illustrated embodiment, the HMU 310 provides communication between a host 360 and the device 300 (and/or components thereof), for example receiving host IOs from the host and providing IO completion confirmations to the host. As used herein, the terms "complete," "completion" and "completion message" mean a notification to the host or another component that an operation (e.g., an IO) has reached a particular status. In many cases, the entity (e.g., host, component), etc. that receives the completion message for an operation is the entity that requested or commanded the operation. A completion message need not indicate that a requested operation has been successfully completed, or necessarily that the requested operation has been concluded at all. For example, as described in further detail below, in some cases, a completion message might indicate that a particular operation (e.g., prefetching) will be completed at a later time (e.g., in the case of an immediate prefetch request) or that the operation cannot be completed.

The CDU 315 provides several control features for the device 300. For example, the CDU 315 can receive IOs, e.g. from the HMU 310, the firmware 355, etc. and, based on those requests, dispatch IO commands for execution (e.g., direct or transmit IOs to other components to be executed). Some embodiments feature a VD property table (VDPT). In some embodiments, the VDPT is stored in and/or and maintained by the CDU 315. In some embodiments, the VDPT includes a VDPT element for each VD configured in the system. For instance, the VDPT might comprise a VDPT element corresponding to each of the VDs 310*a*, 310*b*, 301*c*. In some embodiments, the VDPT stores a device handle for every VD in the system; this device handle can be a unique identifier of each VD. In a particular aspect of various embodiments, a VDPT element for a VD 310 can be used to store a value indicating whether the VD is configured to support read ahead.

As used herein, the term "IO" is used generally to mean any input-output operation on a VD (and/or the underlying media), and/or a request or command to perform such an operation. Such operations can include, without limitation, read operations and write operations. In some cases, specific types of IO are mentioned herein where appropriate. While the term "IO" generally can mean a "read IO" (in which data is read from data source, such as a cache, VD, etc.) or a write "write" IO" (in which data is written to a data sink, such as a cache, VD, etc.), the present disclosure generally is directed to read operations; thus, unless the context dictates otherwise, the term "IO" as used herein, is meant to be sufficiently broad to include with "read IO."

Regarding the specific types of IOs, the actual read or write operations on the physical disks of the VD are referred to as "drive IOs." Likewise, the terms "execute," "perform," and "write" (and their derivatives) are used synonymously herein with regard to IOs, and they refer not only to the actual writing of data to disk, but any other actions that are performed along the path from receiving an IO from a host to writing an IO to cache or a VD. Drive IOs are the only input-output operations actually executed on the physical media (e.g., reading data from or writing data to disk); all other types of IOs are actually requests or commands (at various levels of abstraction) to perform one or more drive IOs. Thus, the term "IO," when used without modifiers, can refer to both the actual drive IO and/or any other IO (e.g., requests or commands to perform actions that will result in one or more drive IOs), including without limitation all such IOs described herein.

For instance, one type of IO is a request from a host 360 for data to be read from or written to the VD; this type of IO is referred to as "host IOs." As used herein, the term "host" refers to any device or system (which can be hardware, software, etc.), other than the hardware 301 and firmware 355 of the device managing the RAID (e.g., a RAID controller), that provides requests or commands for IOs. Examples of hosts can include the operating system (sometimes described herein as a "host OS") of a computer using a VD for storage, a storage area network (SAN) device, any other sort of networking device, and/or intermediary devices between any of these and the device (e.g., a RAID controller) performing the procedures described herein. A host IO, in some embodiments, comprises a request to read or write data to the VD 115; this requested data might be of various sizes, and often will need to be divided by the device 300 for processing and/or for more efficient internal communication. In particular embodiments, the host IO can be considered a "SCSI IO" because it is received as part of a SCSI command from the host (e.g., a SCSI PREFETCH command).

Thus, as described further below, the device 300 itself can employ "accelerated IOs," (ACIO) which are internal communications within the device. As used herein, when a component is described as "transmitting," "directing," or executing" or "writing" a host IO, an ACIO, or an IO in general, those terms are meant to include, without limitation, the transmission, direction, execution, writing, etc. of an ACIO that has been generated from a host IO.

In some embodiments, ACIOs can include parent ACIOs. One type of parent ACIO is generated by a component of the hardware 301 (e.g., CDU 315) after the hardware 301 has received a host IO and determined that it should be executed at that time (rather than diverted). The host IO might have been received directly from the host or might have been diverted earlier and then resubmitted for execution, e.g., by the firmware 355. In some cases, the host IO might comprise a request for sufficient data reads/writes that it can be divided into different IOs (e.g., for parallel execution); in this case, the parent ACIO might be used to generate one or more child ACIOs, which are more granular requests for particular read/write operations on the VD, and which can be performed by different threads in parallel, in accordance with some embodiments. In other cases, the parent ACIO is not used to generate any child IOs, and the parent ACIO can itself serve to accomplish the full request of the host IO. The parent ACIO (or, in appropriate cases the child ACIOs generated from the parent ACIO) then can be used to generate the drive IOs, which actually perform the read/write operations on the media of each physical disk. In some cases, a parent ACIO or child ACIO will be divided into a plurality of drive IOs, if the parent or child ACIO, for example, requires reads/writes to multiple arms, because each drive IO might be directed to a single arm (physical disk).

The HCU 320 is the endpoint for host IOs and receives notice, e.g., from the firmware 355, the cache manager 330, the IO manager 340, and/or any other hardware 301, when host IOs have been completed (e.g., completion confirmations). The HCU 320, in some embodiments, can provide such notice to the CDU 315, which can determine what, if any, additional actions should be taken with regard to a completed IO (e.g., notifying a host of the completion). In some embodiments, the buffer manager 325 handles interactions with buffer memory. In some embodiments, in which caching is employed for a VD, the cache manager 330 handles the caching of IOs prior to writing those IOs to disk. In some embodiments, for example, the cache manager 330 is responsible for performing IOs on the cache 365, which, as described herein, can provide better performance for the host 360 than writing IOs to the VD 115 (i.e., the arms 110). The cache manager 330 can also be responsible for flushing IOs stored in the cache 365 to the VD 115 when appropriate. While the cache 365 is shown as being incorporated by the cache manager 330, that arrangement is exemplary, and in many embodiments, the cache 365 will be located elsewhere on the device 300. In general, the cache 360 is a set of reserved memory (e.g., DRAM) that can be used to temporarily hold IO transactions rather than writing the IOs directly to the VD. Various embodiments can employ flexible caching strategies, examples of which are described herein. When a cache is used to store data for a read ahead operation, that cache can be considered a "read ahead cache."

In contrast, the RAID manager 335 handles most interactions between the device 300 and the physical disks (arms) 110. In particular embodiments, the RAID manager 335 comprises the IO manager 340, which handles low-level interaction with the physical disks 310, including the creation of drive IOs to instruct the physical disks 310 to execute the actual reads and writes on the physical media of the disks 110. This interaction is provided through the physical disk interface 350, which provides direct, low-level access to communicate drive-level instructions, such as drive IOs, to the physical disks. The physical disk interface 350 can comprise one or more network interface cards or other communication cards or ports to communicate with the physical disks 110 over a network such as a storage area network (SAN), serial attached small computer system interface (serial attached SCSI or SAS), connections, fibre channel connections, and/or the like.

The task ring manager 345 manages a task ring (shown by broken lines in FIG. 3), which provides high speed communications between the various components of the device 300, including the firmware 355 and the various components of the hardware 301. In a particular embodiment, the task ring carries messages (task ring messages or TRM) that are local to the controller 300 and are used for a variety of purposes while the controller 300 is operating. In an aspect, some TRMs can have a local message index (LMID) field or frame that can hold an ACIO and/or a reference to an ACIO. In another aspect, each ACIO is transmitted in its own TRM. The transmission of ACIOs by TRM provides for enhanced performance in the processing of IOs. For example, a host IO generally is transmitted using a standard message passing interface (MPI) message, which provides relatively slow communications compared to the task ring. This MPI message can be received by the hardware 301 (e.g., the CDU 315), which can create a new parent ACIO from the host IO, if the hardware 301 determines that the host IO should be executed; if not, the hardware 301 (or a component thereof) can copy the data from the host IO into an LMID for diversion to the firmware 355 over the task ring. As noted above, in some cases, the CDU 315 (or another component) might generate child IOs from the parent IO, in which the IO data and other parameters from the parent ACIO might be shared and/or divided among the child ACIOs, for example as described in further detail below. The parent ACIO and/or child ACIOs can then be transmitted to other components for execution, e.g., as described below.

Figure 4:
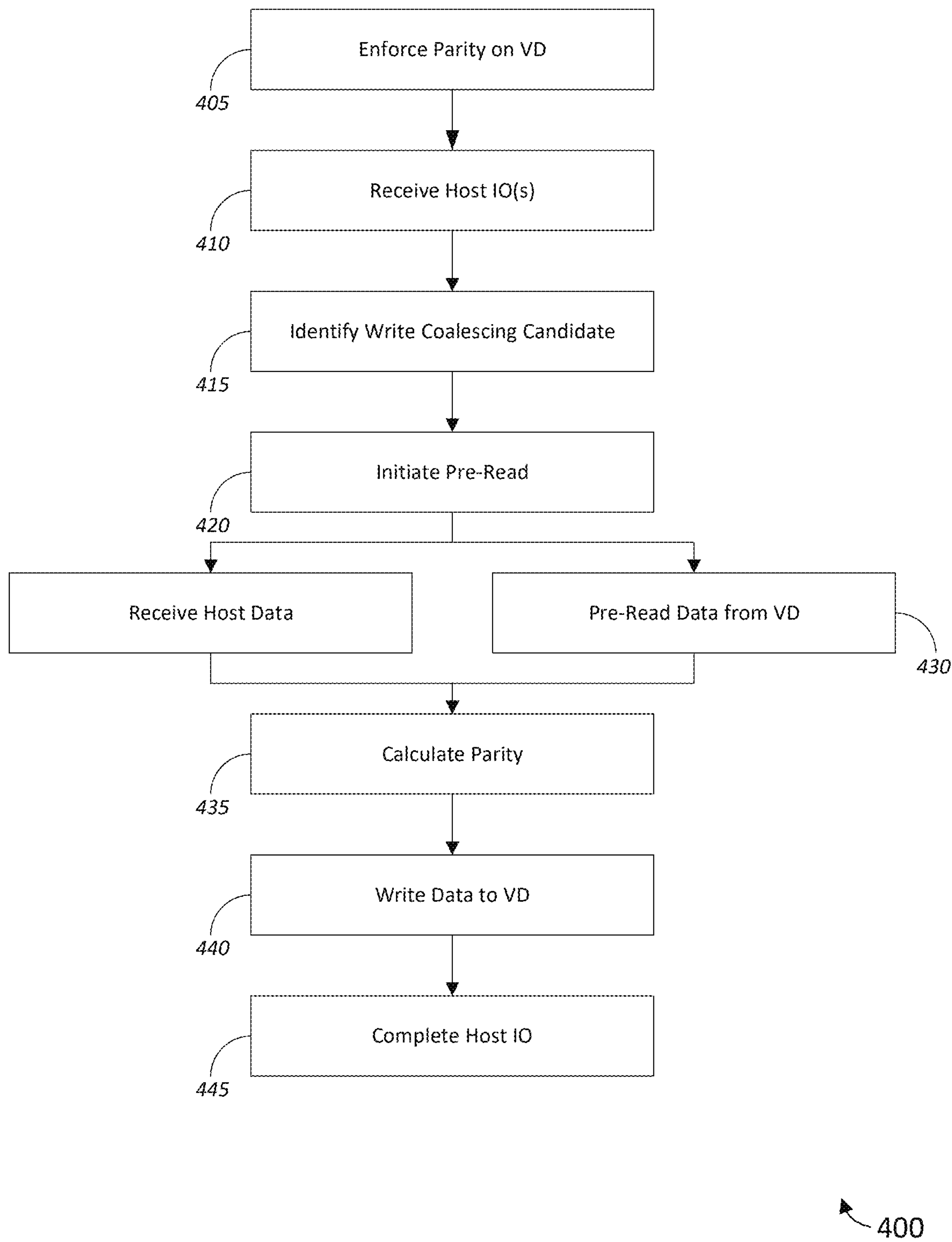
FIG. 4 is a flow diagram illustrating a method of performing a pre-read assisted write coalescing operation on a VD, in accordance with some embodiments.

FIG. 4 illustrates a method 400 of performing a pre-read operation to assist a coalescing write operation on a VD. In an aspect of some embodiments, some or all of the procedures of the method 400 might be performed by various components of a RAID controller, e.g., the CDU 315, cache manager 330, and/or RAID manager of the RAID controller 300 described above with respect to FIG. 3. In other embodiments, however, the procedures of FIG. 4 might be performed by another component of a device, and/or might be distributed among a plurality of components of such a device. In general, the procedures of the method 400 can be embodied and/or performed by logic, e.g., software or firmware instructions executed by a processor of a device and/or dedicated hardware circuitry of a device, and the architecture and/or arrangement of such logic is discretionary within the scope of various embodiments.

At block 405, the method 400 managing a VD that employs parity (e.g., a RAID 5 VD, RAID 6 VD, etc.). As noted above, a VD can comprise one or more spans, each of which can comprise one or more arms; each arm might comprise a physical disk. Also as noted above, the VD can comprise a plurality of stripes, each of which can comprise a row from each of the one or more spans; each row of a span can comprise a strip from each of the arms in the span, each of the strips comprising one or more, such that the plurality of LBA comprising one or more LBA from each of the arms of the span.

Managing a VD, therefore, can comprise many different operations, including without limitation, reading and/or writing data to the physical disks that serve as arms for the VD, calculating and/or storing parity information, controlling caching policies, organizing the physical disks into arms, arms into one or more spans, and/or spans into one or more VDs, maintaining and/or updating such organization (e.g., online capacity expansion operations or RAID level migration operations), performing maintenance operations (or portions thereof) on a VD, and/or the like. In some respects, these different operations might be divided among various components of a device, such as the RAID controller 300 of FIG. 3; as used herein, "managing" a VD means performing some, all, or part of any such operations. As such, different components of the device can be considered to be managing a VD, and the device itself can be considered to be managing a VD.

At block 410, the method 400 comprises receiving one or more host IOs. As discussed above, a host IO is a request from a host to perform IO operations on a VD. In some embodiments, the one or more host IOs will comprise a write IO. As described above, the host IO might be an MPI message (MPIO), and that MPIO can be translated to ACIO, as noted above.

At this point the IO parameters are known and the device hardware can determine which row is to be pre-read; in an aspect, a controller might generate one ACIO for each row affected by the host IO. At block 415, then, the method 400 can comprise identifying the one or more host IOs as a candidate for a write coalescing operation. In some embodiments, this can include determining that a host IO that the one or more host IOs is associated with one or more write IOs directed to a plurality of blocks of the affected row of the VD and/or comparing a number of the plurality of logical blocks to a threshold. Merely by way of example, in some embodiments, a VDPT might include a field, such as a StreamLbaRange field, that defines the number of logical blocks (which might be, e.g., 4 KB each) from the start of a row that should be included in the LBA range check for a stream detection. (The value might be set to 0 when write coalescing is disabled, and a non-zero value might indicate that write coalescing is enabled for the VD and the number of blocks that qualify a host write IO as a write coalescing candidate.

At block 420, the method 400 comprises initiating a pre-read of existing data from one or more rows of the virtual disk (VD), based on identifying the host IO as a candidate for a write coalescing operation; transmitting a message comprising a pre-read local message identifier (LMID). For example, in some embodiments, when the CDU determines that the LBA range of a host IO qualifies for Write Coalescing, it will initiate a pre-read operation for the complete row of the LD. To start the pre-read operation, the CDU might generate a message (e.g., a TRM message) with an ACIO pre-read LMID per write ACIO (each ACIO corresponding to one row) and/or populate it with the necessary parameters to indicate the row to be pre-read e.g. VD device handle, stripe number, span, arm, rowmod, number of blocks to write and set the opcode of the pre-read LMID to a value that identifies the ACIO as relating to a pre-read operation, e.g., IOA_MSG_OPCODE_WT_ROW-_PRE_READ. That message can be transmitted, to another component, such as, for example, the CM, and the CDU might continue processing the write IO as normal, e.g., preparing to allocate resources and fetching host data to the controller using DMA.

At block 425, the method 400 comprises receiving, from the host, a plurality LBA of data to be written to the row. At block 430, the method 400 comprises performing the pre-read of the existing data from the row of the VD where the received data is to be written. An exemplary procedure for performing such a pre-read is described further in connection with FIG. 6, below. At block 435, the method 400 comprises calculating parity data from the plurality of logical blocks of received data and at least some of the data from the row of the VD in the buffer, and at block 440, the method 400 comprises writing to the one or more rows of the VD a set of data comprising the plurality of blocks of received data and the parity data. At block 445, the method 400 comprises transmitting a completion message to host. Although various embodiments are not limited to performing these operations in any particular manner, FIGS. 5 and 6 describe various procedures that can be used, in some embodiments, to accomplish these operations.

Figure 5:
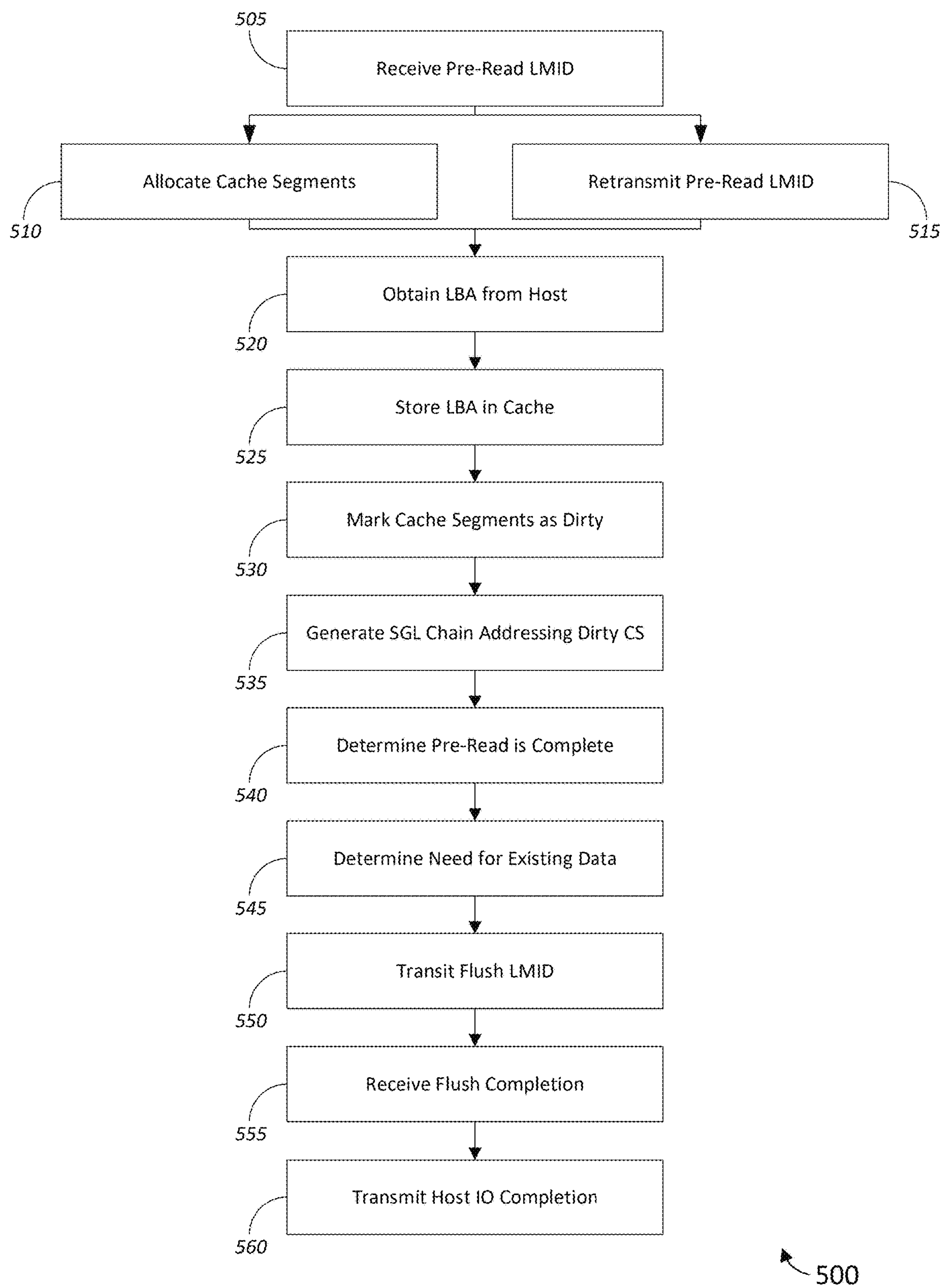
FIGS. 5 and 6 are flow diagrams illustrating various procedures that can be employed in a pre-read assisted write coalescing operation on a VD, in accordance with some embodiments.

Merely by way of example, FIG. 5 is a flow diagram illustrating various procedures that can be employed in a pre-read assisted write coalescing operation on a VD. In an aspect of some embodiments, some or all of the procedures of the method 500 might be performed by a cache manager of a RAID controller, e.g., the cache manager 330 described above with respect to FIG. 3. In other embodiments, however, the procedures of FIG. 5 might be performed by another component of a device, and/or might be distributed among a plurality of components of such a device. In general, the procedures of the method 500 can be embodied and/or performed by logic, e.g., software or firmware instructions executed by a processor of a device and/or dedicated hardware circuitry of a device, and the architecture and/or arrangement of such logic is discretionary within the scope of various embodiments.

At block 505, the method 500 comprises receiving the message with the pre-read LMID. At block 510, the method 500 comprises allocating a plurality of cache segments to store the plurality of logical blocks received from the host, e.g., in response to receiving the message. In an aspect, a component, e.g., the CM, might look up the relevant row in a hash table. If the lookup results in a hash miss (or a hit with an invalid cache segment (CS) ID), the component might allocate a new CS row and link it to the hash table. In some cases, the CM might set a flag, e.g., a RowPreReadIn-Progress bit in a header section of the CS Row to indicate that a row is being pre-read, and/or might set a flag, e.g., ExcludeFromFlush, indicating that the row should not be flushed. In an aspect, the device might prevent this row from being flushed when either of these flags is set unless the row becomes fully dirty (e.g., every CS in the row is filled with new data from the host LBA), in which case the device might perform a proactive flush (i.e., calculating parity and writing the entire row, with parity, to the VD), in which case the CM might set a flag, such as a RowPreReadDiscard bit, in the CS row header. In an aspect of some embodiments, if the firmware issues a flush of the row, e.g., due to timeout, and the RowPreReadInProgress flag is set, it will remain set, but the ExcludeFromFlush flag will be cleared (indicating the firmware timeout), and the row might not be flushed until RowPreReadInProgress is cleared, indicating the pre-read operation (described in further detail below) for the row is completed. In this instance, the row might no longer be considered a write coalescing candidate anymore; nonetheless, in an aspect, any new IOs on the row will accumulate until the pre-read operation completes, leading to indirect write coalescing.

On the other hand, if the hash table lookup results in a cache hit (with a valid CS ID), that can indicate that host IO is not the first candidate for write coalescing on this row, as there are already pending writes to be completed for the row. In this case the pre-read LMID can be ignored, and the method 500 (and/or the method 400 of FIG. 4) might terminate.

Assuming there is no cache hit and the method 500 does not terminate, at block 515, the method 500 can comprise retransmitting the message with the pre-read LMID to another component, which might perform one or more operations in response, including without limitations some or all of the operations described below with regard to FIG. 6. In some aspects, for example the CM will issue the same TRM with the same ACIO pre-read LMID to RM to pre-read the complete row of the VD.

At block 520, the method 500 comprises obtaining LBAs from host to perform the requested host IO. In an aspect, the procedure for obtaining the LBAs might comprise, as noted above, fetching the host data to the controller using DMA. In some embodiments, the CDU might perform the fetch; in others, a different component, such as the CM might fetch the data. In some embodiments, however the data is fetched, it is provided, e.g., to the CM, where it can be stored in one or more of the plurality of allocated cache segments (block 525). At block 530, the method 500 comprises marking as dirty the one or more cache segments storing logical blocks received from the host.

In some embodiments, the device (or components thereof, such as the CM) might use scatter gather lists (SGL) to store cache segment addresses. In an aspect, each SGL might comprise one or more contiguous scatter gather elements (SGE). In another aspect, each SGE might store an address of a cache segment sufficient to store one or more contiguous LBAs (depending on the buffer size) of host data. In some cases, the device (or a component thereof) will allocate and chain multiple SGLs depending on the size of the row of cache segments. In the case of a coalescing write, generally there will be sufficient data to require an SGL chain. At block 535, therefore, the method 500 might comprise generating an SGL chain comprising one or more SGLs (referred to herein as "internal SGL" or "ISGL") addressing the one or more dirty cache segments and/or stitch the cache segments (or portions thereof) to SGEs of the ISGLs.

Figure 6:
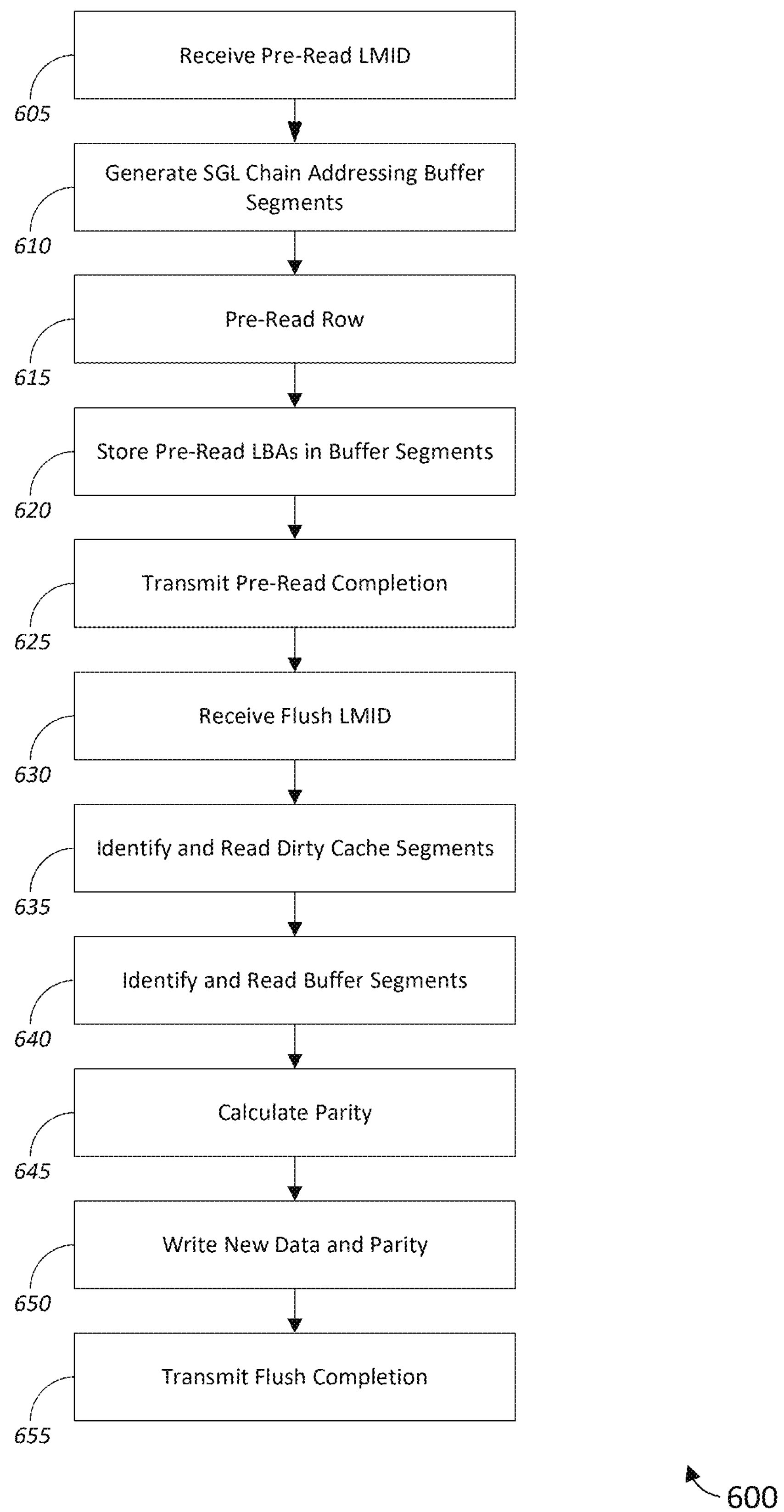

We will turn briefly to FIG. 6, which is a flow diagram illustrating various procedures that can be employed in a pre-read assisted write coalescing operation on a VD. In an aspect of some embodiments, some or all of the procedures of the method 500 might be performed by a RAID manager of a RAID controller, e.g., the RAID manager 335 described above with respect to FIG. 3. In other embodiments, however, the procedures of FIG. 6 might be performed by another component of a device, and/or might be distributed among a plurality of components of such a device. In general, the procedures of the method 600 can be embodied and/or performed by logic, e.g., software or firmware instructions executed by a processor of a device and/or dedicated hardware circuitry of a device, and the architecture and/or arrangement of such logic is discretionary within the scope of various embodiments.

At block 605, the method 600 comprises receiving the re-transmitted message with the pre-read LMID. In some embodiments, the method 600 comprises generating another SGL chain, this one comprising one or more SGLs (referred to herein as "RAID SGL" or "RSGL") addressing the one or more buffer segments into which the existing data read from the VD are stored (block 605). Merely by way of example, in some embodiments, the RM will allocate a RSGL chain and populate it with the addresses of buffer segments allocated to pre-read the data read from all arms of the row. At block 610, the method 600 comprises pre-reading the existing data from the one or more rows of the VD, e.g., by causing the execution of one or more disk read IOs on the VD in response to receiving the message (regenerating data from peer arms if necessary, e.g., the case of a degraded VD), and at block 615, the method 600 comprises storing the data read from the one or more rows of the VD in the allocated buffer segments.

When this has been performed, the method 600 might comprise transmitting a pre-read completion message. The completion message might comprise the same pre-read LMID; in some aspects, the completion message might have an opcode indicating that the operation has been completed, such as MSG_WT_COALESCE_PRE_READ_COMPLETE and/or might include an identifier of the lead RSGL in the RSGL chain addressing the buffers where the existing data read from the VD has been stored.

Returning to FIG. 5, the method 500 might comprise determining that the pre-read operation is complete (block 540). In an aspect, receiving the completion message with the pre-read LMID serves to determine that the pre-read operation has been completed.

In some embodiments, the method 500 comprises determining that at least some of the existing data is necessary to calculate the parity data (block 545). In an aspect, this determination can be made based on the fact that the row of cache segments includes one or more non-dirty segments. In such a case, not all of the data on that row of the VD will be overwritten, so at least some of the existing data read from the VD will be necessary to calculate the parity. Merely by way of example, in some embodiments, the CM will identify the CS row for which the pre-read operation has been completed complete from the LMID details. If the CS row already has been flushed, e.g., due to a proactive hardware flush, and the CS row is not found in the hash table, or if the CS row is the process of being flushed (e.g., as indicated by a FlushInProgress flag set in header of that CS row), the existing data is no longer needed because the row already has been flushed or is being flushed. In this case, the CM might release the RSGL chain and the resources linked to it. Likewise, if the CS row is fully dirty (e.g., as indicated by an existing Full Dirty Extents bitmap field in the CS row), the existing data read from the row of the VD is not needed because all of it will be overwritten anyway, and the parity can be calculated from the dirty segments alone. In this case, the CM might clear the RowPreReadInProgress flag and release the RSGL chain. If the CS row is found with RowPreReadDiscard flag set, which, as noted above, can indicate a proactive flush, the CM might clear the RowPreReadInProgress and RowPreReadDiscard flags and release the RSGL chain and the resources linked to it.

Otherwise, the CM can determine that at least some of the pre-read data will be needed for parity. In some embodiments, it might will lock the CS row, clear the RowPreReadInProgress flag, save the lead RSGL ID (e.g., as received in the pre-read completion message), e.g., a LeadPreReadRsglId field in the CS row and/or unlock the CS row. In particular embodiments, when the CS row is not already being flushed, and there is partial dirty data in the CS row, and the ExcludeFromFlush flag is unset (indicating that the firmware has timed out), the CM will flush the row from the cache.

In some embodiments, flushing the cache might comprise transmitting a message with a flush LMID. In some embodiments, the message might be a TRM message with an opcode such as MSG_WT_COALESCE_PRE_READ_FLUSH. In an aspect, the flush LMID might comprise the identifier of the lead RSGL of RSGL chain (which addresses the buffers storing the existing data read from the row in the VD), which might be stored in a field such as LeadPreReadRsglId. The flush LMID might also comprise an identifier of the lead CS ISGL of the ISGL chain that addresses the dirty cache segments, which might, in some embodiments, identify the arm from where the LBAs of the dirty cache segments begin.

Returning to FIG. 6, at block 630, the method 600 comprises receiving the message with the flush LMID. At block 635, the method 600 comprises identifying the dirty cache segments, based at least in part on the second identifier and reading, from the dirty cache segments, the data blocks received from the host. Similarly, at block 640, the method 600 comprises identifying the one or more buffer segments, based at least in part on the first identifier and reading, from the buffer segments, at least some of the existing data read from the one or more rows of the VD corresponding to the non-dirty cache segments. Merely by way of example, in some embodiments, the RM can identify from the valid LeadPreReadRsglId in the flush LMID that the complete old data for the row has already been pre-read into the buffers addressed by the RSGL chain. In some embodiments, the Lead CS identifier in the ISGL chain can indicate the arm where the dirty data starts. It will be appreciated that, in some aspects, since this is a write coalescing candidate, the dirty data will start at arm zero, because in some embodiments, the data must include at least a threshold number of blocks to write from the beginning of the row to qualify as a write coalescing candidate, e.g., as described above. In some embodiments, since the RSGL chain has the complete old data for all the arms of the row, RM can follow a conventional flow, e.g., a read peers flow, to proceed with the parity calculation and writing the dirty data to the drives from the ISGL chain.

At block 645, the method 600 comprises calculating the parity of the row. Merely by way of example, the RM can use the data read from cache segments identified by the CS ISGL chain and the data read from the buffer segments storing existing LBAs read from the row of the VD corresponding to non-dirty cache segments. In an aspect, various embodiments can use appropriate technique to perform the parity calculation based on this data.

At block 650 then, the method 600 comprises writing the new data and the parity, so that the VD is updated with the data from the host and the new parity based thereon. Merely by way of example, in some embodiments, the RM can cause the execution of one or more disk read IOs on the VD. At that point, the coalesced write operation is largely completed, so the RM might release the resources linked to the RSGL chain and/or set the Lead RSGL ID to INVALID in the Flush LMID. The method 600 then comprises transmitting a flush completion message (block 655). Merely by way of example, the RM might send a message to the CM; one possible message is a TRM message with an opcode such as MSG_WT_COALESCE_PRE_READ_FLUSH_COMPLETE and the original Flush LMID sent by the CM.

Returning to FIG. 5, At block 555, the method 500 comprises receiving the flush completion message, and at block 560, the method 500 comprises transmitting host IO completion. In some embodiments, for example, the CM might receive the flush completion message from the RM, perform any necessary cache cleanup (e.g., clearing the LeadPreReadRsglId in the CS row header) and then transmit a completion message to, e.g., the HCU, which can complete the host IO originally received from the host. In other embodiments, the CM and/or another component can transmit a completion message to the host in a different way. In any event, once the host has been notified that the host IO has been completed, the controller can resume normal operation until receiving another candidate for a coalesced write.

Figure 7:
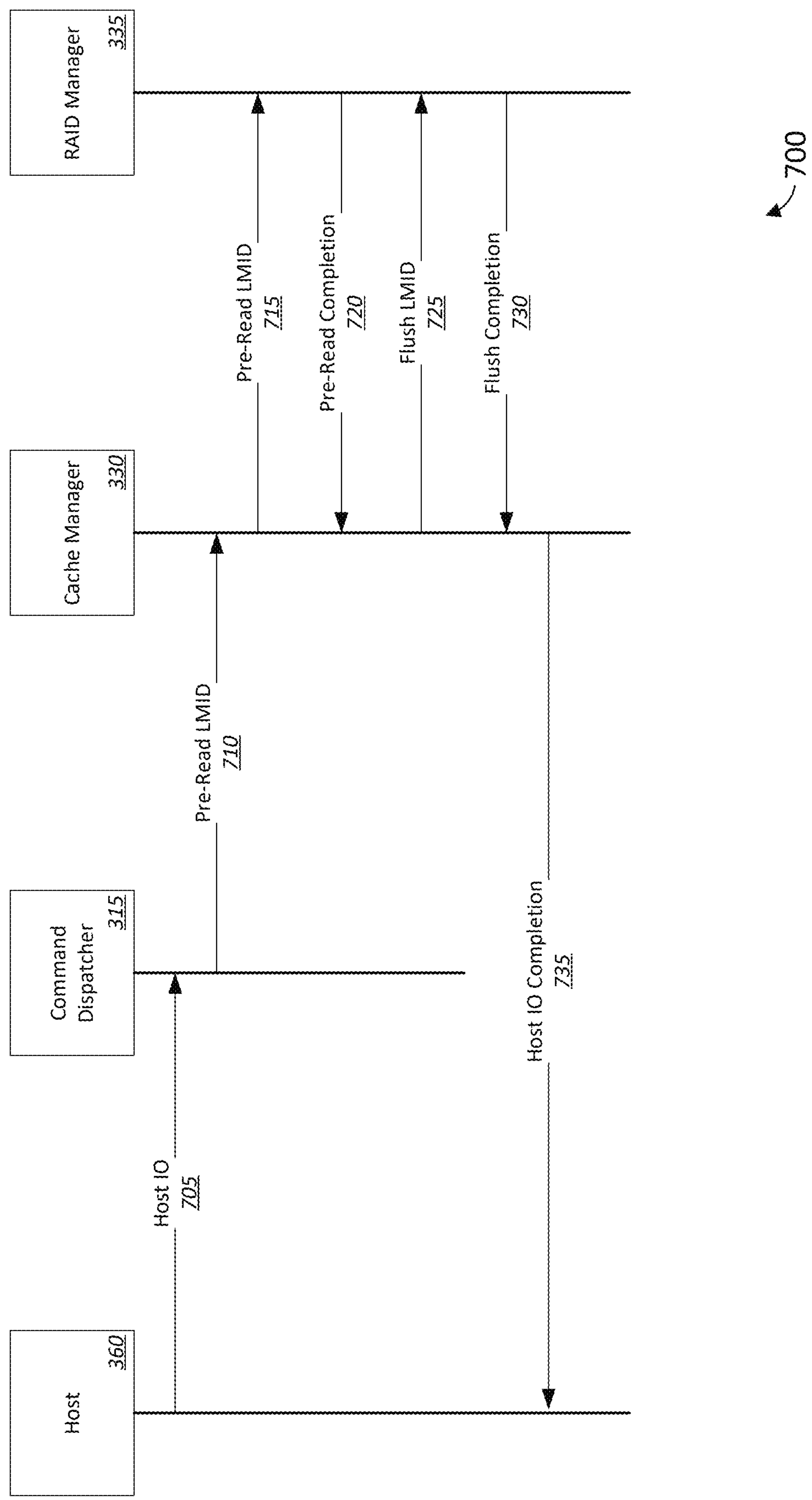
FIG. 7 is a swimlane diagram illustrating a communication flow among various components of a device performing a pre-read assisted write coalescing operation on a VD, in accordance with some embodiments.

FIG. 7 is a swimlane diagram illustrating a communication flow 700 among various components of a device performing a pre-read assisted write coalescing operation on a VD, in accordance with some embodiments. For explanatory purposes, the communication flow 700 will be described in the context of FIGS. 4-6, but it should be understood that any process can be used to implement the communication flow 700.

At block 705, the host 360 transmits a host IO to the RAID controller or other device. In an aspect, the host IO might be transmitted to the CDU, e.g., as described in conjunction with block 405 above. At block 710, the CDU 315 transmits a pre-read LMID to the CM 300, which retransmits the same pre-read LMID to the RM 335 (block 715). After performing the pre-read operation (e.g., as described above in the context of FIG. 6, for example), the RM 335 transmits a pre-read completion message (which might comprise the same pre-read LMID) to the cache manager 330 (block 720). After the CM 330 ensures that the row of the cache should be flushed (e.g., as described above in the context of FIG. 5), the CM 330 sends a flush LMID to the RM 335, which proceeds with calculating the parity and writing the new data and parity (e.g., as described above with respect to FIG. 6) and transmits a flush completion message, which might include the original flush LMID (block 730). The CM 330, then transmits—and/or cooperates with another component to transmit—a host IO completion message (block 735).

Exemplary Computing Environment

Figure 8:
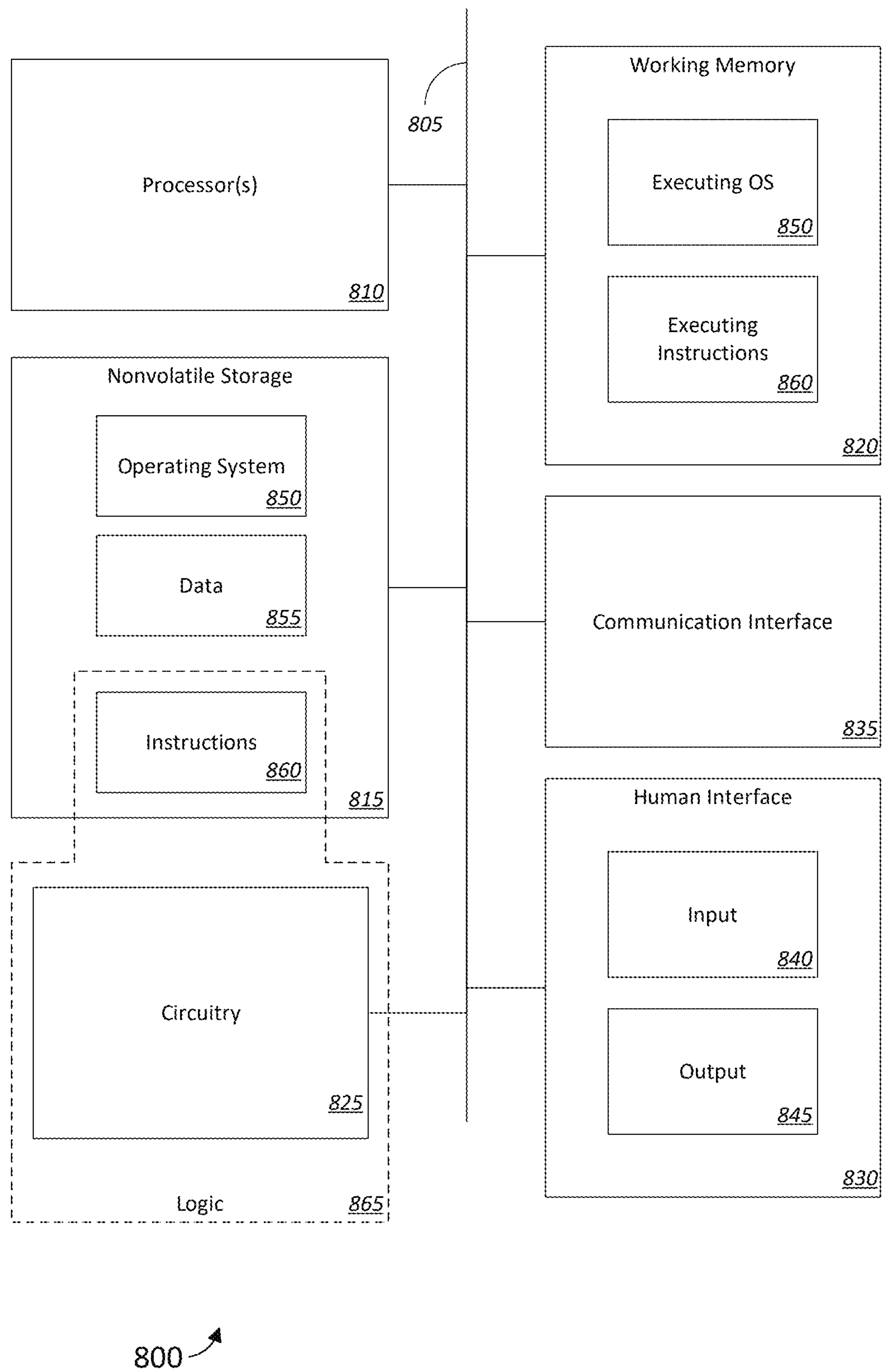
FIG. 8 is a block diagram illustrating example components of a computer system in accordance with some embodiments.

FIG. 8 is a block diagram illustrating an example of a device 800, which can function as described herein, including without limitation serving as a device, a RAID controller, a host, a computer system, etc. (or a component of any of these) in accordance with various embodiments, and/or performing some or all operations of the methods described herein. No component shown in FIG. 8 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 8, the device 800 may include a bus 805. The bus 805 can include one or more components that enable wired and/or wireless communication among the components of the device 800. The bus 805 may couple together two or more components of FIG. 8, such as via operative coupling, communicative coupling, electronic coupling, and/or electric coupling. Such components can include a processor 810, nonvolatile storage 815, working memory (e.g., system dynamic random-access memory (DRAM)) 820, and/or circuitry 825. In some cases, the system 800 can include human interface components 830 and/or a communication interface 835.

While these components are displayed as integrated within the device 800, certain components might be located external from the device 800. As such, the device 800 might include, instead of or in addition to the components themselves, facilities for communicating with such external devices, which therefore can be considered part of the device 800 in some embodiments.

Merely by way of example, the nonvolatile storage 815 can include a hard disk drive (HDD), a solid-state drive (SSD), and/or any other form of persistent storage (i.e., storage that does not require power to maintain the state of the stored data). While such storage often is incorporated within the device 800 itself, such storage might be external to the device 800 and can include external HDD, SSD, flash drives, or the like, as well as networked storage (e.g., shared storage on a file server, etc.), storage on a storage area network (SAN), cloud-based storage, and/or the like. Unless the context dictates otherwise, any such storage can be considered part of the device 800 in accordance with various embodiments. In an aspect, the storage 815 can be non-transitory.

Similarly, the human interface 830 can include input components 840 and/or output components 845, which can be disposed within the device 800, external to the device 800, and/or combinations thereof. The input components 840 can enable the device 800 to receive input, such as user input and/or sensed input. For example, the input components 840 may include a touch screen, a keyboard, a keypad, a mouse, a button, a microphone, a switch, a sensor, a global positioning system sensor, an accelerometer, a gyroscope, and/or an actuator. In some cases, such components can be external to the device 800 and/or can communicate with components internal to the device 800 such as input jacks, USB ports, Bluetooth radios, and/or the like. Similarly, the output component 845 can enable the device 800 to provide output, such as via a display, a printer, a speaker, and/or the like, any of which can be internal to the device 800 and/or external to the device but in communication with internal components, such as a USB port, a Bluetooth radio, a video port, and/or the like. Again, unless the context dictates otherwise, any such components can be considered part of the device 800 in accordance with various embodiments.

From these examples, it should be appreciated that various embodiments can support a variety of arrangements of external and/or internal components, all of which can be considered part of the device 800. In certain embodiments, some or all of these components might be virtualized; examples can include virtual machines, containers (such as Docker containers, etc.), cloud computing environments, platform as a service (PAAS) environments, and/or the like.

In an aspect, the nonvolatile storage 815 can be considered a non-transitory computer readable medium. In some embodiments, the nonvolatile storage 815 can be used to store software and/or data for use by the device 800. Such software/data can include an operating system 850, data 855, and/or instructions 860. The operating system can include instructions governing the basic operation of the device 800 and can include a variety of personal computer or server operating systems, embedded operating systems, and/or the like, depending on the nature of the device 800. The data 855 can include any of a variety of data used or produced by the device 800 (and/or the operation thereof), such as media content, databases, documents, and/or the like. The instructions 860 can include software code, such as applications, object code, assembly, binary, etc. used to program the processor 810 to perform operations in accordance with various embodiments. In an aspect, the operating system 850 can be considered part of the instructions 860 in some embodiments.

The processor 810 can include one or more of a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. The processor 810 can be implemented in hardware, firmware, or a combination of hardware, firmware and/or software. In some implementations, the processor 810 includes one or more processors capable of being programmed to perform one or more operations or processes described elsewhere herein.

For example, in some embodiments, the device 800 can comprise logic 865. Such logic can be any sort of code, instructions, circuitry, or the like that can cause the device 800 to operate in accordance with the embodiments herein (e.g., to perform some or all of the processes and/or operations described herein). Merely by way of example, the logic 865 can include the instructions 860, which might be stored on the nonvolatile storage 815 as noted above, loaded into working memory 820, and/or executed by the processor 810 to perform operations and methods in accordance with various embodiments. In an aspect, these instructions 860 can be considered to be programming the processor 810 to operate according to such embodiments. In the same way, the operating system 850 (to the extent it is discrete from the instructions 860) might be stored on the nonvolatile storage 815, loaded into working memory 820, and/or executed by a processor 810.

Alternatively, and/or additionally, logic can include the circuitry 825 (e.g., hardware or firmware), which can operate independently of, or collaboratively with, any processor 810 the device 800 might or might not have. (As noted above, in some cases, the circuitry 850 itself can be considered a processor 810.) The circuitry 825 might be embodied by a chip, SoC, ASIC, programmable logic device (FPGA, EPLD, etc.), and/or the like. Thus, some or all of the logic enabling or causing the performance of some or all of the operations described herein might be encoded in hardware or firmware circuitry (e.g., circuitry 850) and executed directly by such circuitry, rather than being software instructions 860 loaded into working memory 820. (In some cases, this functionality can be embodied by hardware instructions). Thus, unless the context dictates otherwise, embodiments described herein are not limited to any specific combination of hardware, firmware, and/or software.

The device 800 can also include a communication interface 835, which can enable the device 800 to communicate with other devices via a wired (e.g., electrical and/or optical) connection and/or a wireless (RF) connection. For example, the communication interface 860 may include one or more RF subsystems (such a Bluetooth subsystem, such as those described above, for example, a Wi-Fi subsystem, a 5G or cellular subsystem, etc.). Additionally or alternatively, some such systems can be implemented in combination, as discrete chips, as SoCs, and/or the like. The communication interface 835 can further include a modem, a network interface card, and/or an antenna. In some cases, the communication interface 830 might comprise a plurality of I/O ports, each of which can be any facility that provides communication between the device 800 and other devices; in particular embodiments, such ports can network ports, such as Ethernet ports, fiber ports, etc. Other embodiments can include different types of I/O ports, such as serial ports, pinouts, and/or the like. Depending on the nature of the device 800, the communication interface 835 can include any standard or proprietary components to allow communication as described in accordance with various embodiments.

ADDITIONAL EXAMPLES

A RAID controller in accordance with some embodiments might manage VD that employs parity. In an aspect, the VD might comprise one or more spans, each span comprising one or more arms, each arm corresponding a physical disk. In another aspect, the VD might further comprise a plurality of stripes, each stripe comprising a row from each of the one or more spans, each row of a span comprising a strip from each of the one or more arms of the span, each strip comprising one or more LBAs.

In some embodiments, the RAID controller comprises a command dispatch unit (CDU). The CDU might comprise hardware circuitry to receive one or more host input-output operations (IO). In some embodiments, the CDU might comprise hardware circuitry to identify the one or more host IOs as a candidate for a write coalescing operation. In some embodiments, the CDU might comprise hardware circuitry to send a first message to initiate a pre-read of existing data from one or more rows of the VD, e.g., based on identifying the host IO as a candidate for a write coalescing operation. In some embodiments, the CDU might comprise hardware circuitry to fetch, subsequent to initiation of the pre-read of the existing data from the row of the VD, a plurality LBAs of data from the host.

In some embodiments, the RAID controller comprises a cache manager. The cache manager might comprise hardware circuitry to receive the first message; hardware circuitry to allocate the one or more cache segments; and/or hardware circuitry to re-transmit the first message. The cache manager might further comprise hardware circuitry to store, in one or more of the plurality of allocated cache segments, the plurality of LBAs received from the host, and/or hardware circuitry to mark as dirty the one or more cache segments storing LBAs received from the host.

In some embodiments, the RAID controller further comprises a RAID manager. In some embodiments, the RAID manager might comprise hardware circuitry to perform, in response to the re-transmitted first message, the pre-read of the existing data from the one or more rows of the VD. In some embodiments, this pre-read might be performed in parallel with the cache manager storing the plurality of blocks received from the host in the one or more allocated cache segments. In some embodiments, the RAID manager further comprises hardware circuitry to calculate parity data from the received LBAs of data stored in the one or more dirty cache segments and at least a portion of the data read from the virtual disk. In an aspect of some embodiments, the at least a portion of the data read from the virtual disk corresponds to each of one or more non-dirty allocated cache segments. In some embodiments, the RAID manager further comprises hardware circuitry to write to the one or more rows of the VD a set of data comprising the plurality of blocks of received data and the parity data.

A device in accordance with another set of embodiments might comprise logic to manage a virtual disk VD employing parity. In some embodiments, the device comprises logic to manage a virtual disk (VD) employing parity, the VD comprising a plurality of stripes, each stripe comprising a row from each of a plurality of physical disks. In some embodiments, the device comprises logic to receive one or more host input-output operations (IO). In some embodiments, the device comprises logic to identify the one or more host IOs as a candidate for a write coalescing operation. In some embodiments, the device comprises logic to initiate a pre-read of existing data from one or more rows of the VD, based on identifying the host IO as a candidate for a write coalescing operation. In some embodiments, the device comprises logic to receive, e.g., subsequent to initiation of the pre-read of the existing data from the row of the VD, a plurality of LBA from the host.

In some embodiments, the device comprises logic to perform the pre-read of the existing data from the one or more rows of the VD.

In some embodiments, the device comprises logic to calculate parity data from the plurality of LBAs of received data and at least some of the data from the row of the VD in the buffer. In some embodiments, the device comprises logic to write to the one or more rows of the VD a set of data comprising the plurality of blocks of received data and the parity data.

In some embodiments, the VD is part of a redundant array of independent disks (RAID) array comprising a plurality of physical disks, and wherein the device comprises a RAID controller. In some embodiments, the row comprises a plurality of strips, the plurality of strips comprising a strip from each of the plurality of physical disks. In some embodiments, the logic to read existing data from the row of the VD and the logic to receive the from the host data to be written to row of the VD operate in parallel. In some embodiments, the logic to identify the one or more host IOs as a candidate for a write coalescing operation comprises logic to determine that the one or more host IOs is associated with one or more write IOs directed to a plurality of blocks of the row of the VD, and/or logic to compare a number of the plurality of LBAs to a threshold.

In some embodiments, the logic to receive a plurality LBAs of data from the host comprises logic to use direct memory access (DMA) to obtain the plurality of LBAs from the host. In some embodiments, the device further comprises logic to allocate a plurality of cache segments to store the plurality of LBAs received from the host. In some embodiments, the logic to allocate one or more cache segments to cache the first row comprises logic in a first component that transmits a message comprising a pre-read local message identifier (LMID), and/or logic in a second component that receives the message and/or allocates the one or more cache segments.

In some embodiments, the logic to initiate a pre-read of the entirety of the first row from the virtual disk comprises logic in the second component that retransmits the message, and/or logic in a third component that receives the retransmitted message and/or causes the execution of one or more disk read IOs on the VD in response to receiving the message. In some embodiments, the message comprises a virtual disk identifier associated with the first row, a stripe identifier associated with the first row, a span identifier associated with the first row, an arm identifier associated with a strip of the first row, an LBA identifier of a first LBA to be read, and/or a number of LBAs to be read.

In some embodiments, the device further comprises logic to store, in one or more of the plurality of allocated cache segments, the plurality of LBAs received from the host, and/or logic to mark as dirty the one or more cache segments storing LBAs received from the host.

In some embodiments, the logic to calculate parity data comprises logic to calculate the parity data from the received LBAs of data stored in the one or more dirty cache segments and/or at least a portion of the data read from the virtual disk, the at least a portion of the data corresponding to each of one or more non-dirty allocated cache segments. In some embodiments, the device further comprises logic to store the data read from the one or more rows of the VD in one or more buffer segments, and/or logic to generate a first scatter gather list (SGL) chain comprising one or more SGLs addressing the one on more buffer segments. In some embodiments, the device further comprises logic to generate a second SGL chain comprising one or more SGLs addressing the one or more dirty cache segments. In some embodiments, the logic to calculate parity data further comprises logic in a first component that transmits a message with a flush local message identifier (LMID), the flush LMID comprising a first identifier of a first lead SGL of the first SGL chain and/or a second identifier of a second lead SGL of the second SGL chain. In some embodiments, the logic to calculate parity data further comprises logic in a second component that receives the message, identifies the dirty cache segments, based at least in part on the second identifier, reads, from the dirty cache segments, the data blocks received from the host, identifies the one or more buffer segments, based at least in part on the first identifier, and/or reads, from the buffer segments, at least some of the existing data read from the one or more rows of the VD corresponding to the non-dirty cache segments.

In some embodiments, the device further comprises logic to determine that the pre-read of the existing data from the one or more rows of the VD has been completed before calculating the parity data. In some embodiments, the device further comprises logic to determine that the at least some of the existing data is necessary to calculate the parity data before transmitting the message with the flush LMID.

In some embodiments, at least some of the logic comprises hardware circuitry.

A method in accordance with some embodiments comprises managing a virtual disk (VD) employing parity, the VD comprising a plurality of stripes, each stripe comprising a row from each of a plurality of physical disks.

In some embodiments, the method comprises receiving one or more host input-output operations (IO). In some embodiments, the method comprises identifying the one or more host IOs as a candidate for a write coalescing operation. In some embodiments, the method comprises initiating a pre-read of existing data from one or more rows of the virtual disk (VD), based on identifying the host IO as a candidate for a write coalescing operation.

In some embodiments, the method comprises receiving, subsequent to initiation of the pre-read of the existing data from the row of the VD, a plurality logical blocks (LBA) of data from the host. In some embodiments, the method comprises performing the pre-read of the existing data from the one or more rows of the VD. In some embodiments, the method comprises calculating parity data from the plurality of LBAs of received data and at least some of the data from the row of the VD in the buffer. In some embodiments, the method comprises writing to the one or more rows of the VD a set of data comprising the plurality of blocks of received data and the parity data.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the implementations to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components, (including without limitation processors, other hardware circuitry, custom integrated circuits (ICs), programmable logic, etc.) and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods does not limit the implementations unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A redundant array of independent disks (RAID) controller to manage a virtual disk (VD) that employs parity, the VD comprising one or more spans, each span comprising one or more arms, each arm corresponding a physical disk, the VD further comprising a plurality of stripes, each stripe comprising a row from each of the one or more spans, each row of a span comprising a strip from each of the one or more arms of the span, each strip comprising one or more logical blocks (LBA), the RAID controller comprising:

a command dispatch unit (CDU) comprising:

hardware circuitry to receive one or more host input-output operations (IO);

hardware circuitry to identify the one or more host IOs as a candidate for a write coalescing operation;

hardware circuitry to send a first message to initiate a pre-read of existing data from one or more rows of the VD, based on identifying the host IO as a candidate for a write coalescing operation; and hardware circuitry to fetch, subsequent to initiation of the pre-read of the existing data from the row of the VD, a plurality LBAs of data from the host;

a cache manager, comprising:

hardware circuitry to receive the first message;

hardware circuitry to allocate one or more cache segments;

hardware circuitry to re-transmit the first message;

hardware circuitry to store, in one or more of the plurality of allocated cache segments, the plurality of LBAs received from the host; and hardware circuitry to mark as dirty the one or more cache segments storing LBAs received from the host; and a RAID manager, comprising:

hardware circuitry to receive the re-transmitted first message;

hardware circuitry to perform, in response to the re-transmitted first message, the pre-read of the existing data from the one or more rows of the VD in parallel with the cache manager storing the plurality of blocks received from the host in the one or more allocated cache segments;

hardware circuitry to calculate parity data from:

the received LBAs of data stored in the one or more dirty cache segments; and at least a portion of the data read from the virtual disk, the at least a portion of the data corresponding to each of one or more non-dirty allocated cache segments; and hardware circuitry to write to the one or more rows of the VD a set of data comprising the plurality of blocks of received data and the parity data.

2. A device, comprising:

logic to manage a virtual disk (VD) employing parity, the VD comprising a plurality of stripes, each stripe comprising a row from each of a plurality of physical disks;

logic to receive one or more host input-output operations (IO);

logic to identify the one or more host IOs as a candidate for a write coalescing operation;

logic to initiate a pre-read of existing data from one or more rows of the VD, based on identifying the host IO as a candidate for a write coalescing operation;

logic to receive, subsequent to initiation of the pre-read of the existing data from the row of the VD, a plurality logical blocks (LBA) of data from the host;

logic to perform the pre-read of the existing data from the one or more rows of the VD;

logic to calculate parity data from the plurality of LBAs of received data and at least some of the data from the row of the VD in the buffer; and logic to write to the one or more rows of the VD a set of data comprising the plurality of blocks of received data and the parity data.

3. The device of claim 2, wherein the VD is part of a redundant array of independent disks (RAID) array comprising a plurality of physical disks, and wherein the device comprises a RAID controller.

4. The device of claim 3, wherein the row comprises a plurality of strips, the plurality of strips comprising a strip from each of the plurality of physical disks.

5. The device of claim 2, wherein:

the logic to read existing data from the row of the VD and the logic to receive the from the host data to be written to row of the VD operate in parallel.

6. The device of claim 2, wherein:

the logic to identify the one or more host IOs as a candidate for a write coalescing operation comprises:

logic to determine that the one or more host IOs is associated with one or more write IOs directed to a plurality of blocks of the row of the VD; and logic to compare a number of the plurality of LBAs to a threshold.

7. The device of claim 2, further comprising:

logic to allocate a plurality of cache segments to store the plurality of LBAs received from the host.

8. The device of claim 7, wherein:

the logic to allocate one or more cache segments plurality of LBAs comprises:

logic in a first component that transmits a message comprising a pre-read local message identifier (LMID); and logic in a second component that:

receives the message; and allocates the one or more cache segments.

9. The device of claim 8, wherein the logic to initiate a pre-read of the entirety of the first row from the virtual disk comprises;

logic in the second component that retransmits the message; and logic in a third component that:

receives the retransmitted message; and causes the execution of one or more disk read IOs on the VD in response to receiving the message.

10. The device of claim 9, wherein the message comprises:

a virtual disk identifier associated with the first row;

a stripe identifier associated with the first row;

a span identifier associated with the first row;

an arm identifier associated with a strip of the first row;

an LBA identifier of a first LBA to be read; and a number of LBAs to be read.

11. The device of claim 7, further comprising:

logic to store, in one or more of the plurality of allocated cache segments, the plurality of LBAs received from the host; and logic to mark as dirty the one or more cache segments storing LBAs received from the host.

12. The device of claim 11, wherein:

the logic to calculate parity data comprises logic to calculate the parity data from:

the received LBAs of data stored in the one or more dirty cache segments; and at least a portion of the data read from the virtual disk, the at least a portion of the data corresponding to each of one or more non-dirty allocated cache segments.

13. The device of claim 12, further comprising:

logic to store the data read from the one or more rows of the VD in one or more buffer segments; and logic to generate a first scatter gather list (SGL) chain comprising one or more SGLs addressing the one on more buffer segments.

14. The device of claim 13, further comprising:

logic to generate a second SGL chain comprising one or more SGLs addressing the one or more dirty cache segments.

15. The device of claim 14, wherein:

the logic to calculate parity data further comprises:

logic in a first component that:

transmits a message with a flush local message identifier (LMID), the flush LMID comprising:

a first identifier of a first lead SGL of the first SGL chain; and a second identifier of a second lead SGL of the second SGL chain; and logic in a second component that:

receives the message;

identifies the dirty cache segments, based at least in part on the second identifier;

reads, from the dirty cache segments, the data blocks received from the host;

identifies the one or more buffer segments, based at least in part on the first identifier; and reads, from the buffer segments, at least some of the existing data read from the one or more rows of the VD corresponding to the non-dirty cache segments.

16. The device of claim 15, further comprising:

logic to determine that the at least some of the existing data is necessary to calculate the parity data before transmitting the message with the flush LMID.

17. The device of claim 7, further comprising:

logic to determine that the pre-read of the existing data from the one or more rows of the VD has been completed before calculating the parity data.

18. The device of claim 2, wherein:

the logic to receive a plurality LBAs of data from the host comprises:

logic to use direct memory access (DMA) to obtain the plurality of LBAs from the host.

19. The device of claim 2, wherein at least some of the logic comprises hardware circuitry.

20. A method, comprising:

managing a virtual disk (VD) employing parity, the VD comprising a plurality of stripes, each stripe comprising a row from each of a plurality of physical disks;

receiving one or more host input-output operations (IO);

identifying the one or more host IOs as a candidate for a write coalescing operation;

initiating a pre-read of existing data from one or more rows of the virtual disk (VD), based on identifying the host IO as a candidate for a write coalescing operation;

receiving, subsequent to initiation of the pre-read of the existing data from the row of the VD, a plurality logical blocks (LBA) of data from the host;

performing the pre-read of the existing data from the one or more rows of the VD;

calculating parity data from the plurality of LBAs of received data and at least some of the data from the row of the VD in the buffer; and writing to the one or more rows of the VD a set of data comprising the plurality of blocks of received data and the parity data.

* * * * *